US012260810B1

(12) United States Patent
Zhu

(10) Patent No.: US 12,260,810 B1
(45) Date of Patent: Mar. 25, 2025

(54) PIXEL DRIVING CIRCUIT, DRIVING METHOD FOR PIXEL DRIVING CIRCUIT, AND DISPLAY PANEL

(71) Applicant: Guangzhou China Star Optoelectronics Semiconductor Display Technology Co., LTd., Guangdong (CN)

(72) Inventor: Maoxia Zhu, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/511,707

(22) Filed: Nov. 16, 2023

(30) Foreign Application Priority Data

Sep. 21, 2023 (CN) ......................... 202311227414.3

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0852* (2013.01); *G09G 2320/043* (2013.01)

(58) Field of Classification Search
CPC ... G09G 3/32–3291; G09G 2300/0426; G09G 2300/0819; G09G 2300/0852
See application file for complete search history.

(56) References Cited

U.S. PATENT DOCUMENTS

2019/0164476 A1* 5/2019 Feng .................... H10K 10/482
2023/0386410 A1* 11/2023 Kawachi ............. H01L 27/1255
2024/0005857 A1* 1/2024 Gao ..................... G09G 3/3233

* cited by examiner

*Primary Examiner* — Gene W Lee
(74) *Attorney, Agent, or Firm* — PV IP PC; Wei Te Chung

(57) ABSTRACT

A pixel driving circuit, a driving method for the pixel driving circuit, and a display panel are provided. The pixel driving circuit includes a writing module, a driving transistor, and a light-emitting element. The writing module is electrically connected to a data signal terminal, and is electrically connected to a first node and a second node. The driving transistor is a double-gate transistor. A first gate of the driving transistor is electrically connected to the first node. A second gate of the driving transistor is electrically connected to the second node. A source of the driving transistor is electrically connected to a first power signal terminal. A drain of the driving transistor is electrically connected to a third node. The light-emitting element is electrically connected to a second power signal terminal and electrically connected to the third node.

16 Claims, 4 Drawing Sheets

PIXEL DRIVING CIRCUIT, DRIVING METHOD FOR PIXEL DRIVING CIRCUIT, AND DISPLAY PANEL

CROSS REFERENCE TO RELATED APPLICATIONS

This application claims priority to Chinese Patent Application No. 202311227414.3, filed on Sep. 21, 2023, and entitled "PIXEL DRIVING CIRCUIT, DRIVING METHOD FOR PIXEL DRIVING CIRCUIT, AND DISPLAY PANEL". The entire disclosures of the above application are incorporated herein by reference.

TECHNICAL FIELD

The present disclosure relates to the field of display technologies, and in particular to a pixel driving circuit, a driving method for the pixel driving circuit, and a display panel.

BACKGROUND

In existing pixel driving circuits, most transistors use low-temperature polysilicon thin film transistors or oxide thin film transistors. Compared with general amorphous silicon thin film transistors, the low-temperature polysilicon thin film transistors and the oxide thin film transistors have higher mobility and more stable characteristics, and are more suitable for configuration in active matrix organic light-emitting diode displays.

However, due to the limitations of a crystallization process, the low-temperature polysilicon thin film transistors fabricated on large-area glass substrates often have non-uniformity in electrical parameters such as threshold voltage and mobility. This non-uniformity will be converted into differences in driving current and brightness of organic light-emitting diode devices, and will be perceived by human eyes as color unevenness. Although the oxide thin film transistors have better process uniformity, they are similar to the amorphous silicon thin film transistors, under long-term pressure and high temperature, due to a gate voltage, part of the negative charges in a channel layer are captured into an interface between the channel layer and a gate insulating layer or directly into the gate insulating layer. As a result, part of the gate voltage is shielded, causing a threshold voltage to drift and causing poor display problems.

Accordingly, it is necessary to provide a pixel driving circuit, a driving method for the pixel driving circuit, and a display panel to improve this issue.

SUMMARY

Embodiments of the present disclosure provide a pixel driving circuit, a driving method for the pixel driving circuit, and a display panel, which can prevent a threshold voltage from drifting significantly due to long-term pressurization, thereby solving the problem of poor display caused by the drifting of the threshold voltage.

An embodiment of the present disclosure provides a pixel driving circuit, including:

a writing module electrically connected to a data signal terminal, and electrically connected to a first node and a second node, where the writing module is configured to connect the data signal terminal to the first node and the second node, or to disconnect the data signal terminal from the first node and the second node;

a driving transistor, where the driving transistor is a double-gate transistor, a first gate of the driving transistor is electrically connected to the first node, a second gate of the driving transistor is electrically connected to the second node, a source of the driving transistor is electrically connected to a first power signal terminal, a drain of the driving transistor is electrically connected to a third node, and the driving transistor is configured to connect the first power signal terminal and the third node, or to disconnect the first power signal terminal from the third node; and a light-emitting element electrically connected to a second power signal terminal, and electrically connected to the third node.

In any one frame period, one of the first gate and the second gate is controlled by a data signal output by the data signal terminal to turn on the driving transistor; and in a plurality of frame periods, the first gate and the second gate are alternately controlled by the data signal to turn on the driving transistor.

According to one embodiment of the present disclosure, the writing module includes:

a first transistor, where a gate of the first transistor is electrically connected to a first scan signal terminal, a source of the first transistor is electrically connected to the data signal terminal, and a drain of the first transistor is electrically connected to the first node; and a second transistor, where a gate of the second transistor is electrically connected to a second scan signal terminal, a source of the second transistor is electrically connected to the data signal terminal, and a drain of the second transistor is electrically connected to the second node.

According to one embodiment of the present disclosure, the first scan signal terminal outputs a first scan signal, the second scan signal terminal outputs a second scan signal, a driving time sequence of the pixel driving circuit includes a data writing stage and a data clearing stage, and the driving time sequence of the pixel driving circuit includes a first driving time sequence and a second driving time sequence;

in the data writing stage of the first driving time sequence, the first scan signal is at a high potential, the second scan signal is at a low potential, the data signal is at the high potential, and the driving transistor is in an on-state; in the data clearing stage of the first driving time sequence, the first scan signal is at the low potential, the second scan signal is at the high potential, the data signal is at the low potential, and the driving transistor is in an off-state;

in the data writing stage of the second driving time sequence, the first scan signal is at the low potential, the second scan signal is at the high potential, the data signal is at the high potential, and the driving transistor is in the on-state; in the data clearing stage of the second driving time sequence, the first scan signal is at the high potential, the second scan signal is at the low potential, the data signal is at the low potential, and the driving transistor is in the off-state; and in any one frame period, the pixel driving circuit is driven in one of the first driving time sequence and the second driving time sequence; and in a plurality of frame periods, the pixel driving circuit is alternately driven in the first driving time sequence and the second driving time sequence.

According to one embodiment of the present disclosure, the pixel driving circuit further includes a storage module, where the storage module is electrically connected to the first node, the second node, and the third node, and the storage module is configured to store and maintain a threshold voltage of the driving transistor.

According to one embodiment of the present disclosure, the storage module includes:

a first storage capacitor, where a first electrode of the first storage capacitor is electrically connected to the first node, and a second electrode of the first storage capacitor is electrically connected to the third node; and a second storage capacitor, where a first electrode of the second storage capacitor is electrically connected to the second node, and a second electrode of the second storage capacitor is electrically connected to the third node.

According to one embodiment of the present disclosure, the pixel driving circuit further includes a reset module, and the reset module includes:

a first capacitor, where a first electrode of the first capacitor is electrically connected to the first power signal terminal, and a second electrode of the first capacitor is electrically connected to the third node; and a third transistor, where a gate of the third transistor is electrically connected to a third scan signal terminal, a source of the third transistor is electrically connected to a sensing signal terminal, and a drain of the third transistor is electrically connected to the third node.

According to one embodiment of the present disclosure, the pixel driving circuit further includes a light-emitting control module, and the light-emitting control module includes a fourth transistor, a gate of the fourth transistor is electrically connected to a fourth scan signal terminal, a source of the fourth transistor is electrically connected to the first power signal terminal, and a drain of the fourth transistor is electrically connected to the source of the driving transistor.

An embodiment of the present disclosure also provides a driving method for driving the above-mentioned pixel driving circuit. A driving time sequence of the driving method includes:

an initialization stage for resetting the first node, the second node, and the third node;

a threshold voltage acquisition and storage stage for charging the third node until a voltage difference between the first node or the second node and the third node is equal to the threshold voltage of the driving transistor;

a data writing stage for outputting, by the writing module, the data signal to one of the first node and the second node, where one of the first gate and the second gate is controlled by the data signal to turn on the driving transistor;

a data clearing stage for outputting, by the writing module, the data signal to the other one of the first node and the second node, where the other one of the first gate and the second gate is controlled by the data signal to turn off the driving transistor; and a light-emitting stage for causing the light-emitting element to emit light.

In any one frame period, one of the first gate and the second gate is controlled by the data signal to turn on the driving transistor; and in a plurality of frame periods, the first gate and the second gate are alternately controlled by the data signal to turn on the driving transistor.

According to one embodiment of the present disclosure, the driving time sequence of the driving method includes a first driving time sequence and a second driving time sequence;

in the data writing stage of the first driving time sequence, the writing module connects the data signal terminal and the first node, the data signal terminal outputs the data signal to the first node, the data signal is at a high potential, and the first gate is controlled by of the data signal to turn on the driving transistor; in the data clearing stage of the first driving time sequence, the writing module connects the data signal terminal and the second node, the data signal terminal outputs the data signal to the second node, the data signal is at a low potential, and the second gate is controlled by the data signal to turn off the driving transistor;

in the data writing stage of the second driving time sequence, the writing module connects the data signal terminal and the second node, the data signal terminal outputs the data signal to the second node, the data signal is at the high potential, and the second gate is controlled by of the data signal to turn on the driving transistor; in the data clearing stage of the second driving time sequence, the writing module connects the data signal terminal and the first node, the data signal terminal outputs the data signal to the first node, the data signal is at the low potential, and the first gate is controlled by the data signal to turn off the driving transistor; and in any one frame period, the pixel driving circuit is driven in one of the first driving time sequence and the second driving time sequence; and in a plurality of frame periods, the pixel driving circuit is alternately driven in the first driving time sequence and the second driving time sequence.

According to one embodiment of the present disclosure, the writing module includes:

a first transistor, where a gate of the first transistor is electrically connected to a first scan signal terminal, a source of the first transistor is electrically connected to the data signal terminal, and a drain of the first transistor is electrically connected to the first node; and a second transistor, where a gate of the second transistor is electrically connected to a second scan signal terminal, a source of the second transistor is electrically connected to the data signal terminal, and a drain of the second transistor is electrically connected to the second node.

According to one embodiment of the present disclosure, the pixel driving circuit further includes a storage module, the storage module is electrically connected to the first node, the second node, and the third node, and the storage module is configured to store and maintain a threshold voltage of the driving transistor.

According to one embodiment of the present disclosure, the storage module includes:

a first storage capacitor, where a first electrode of the first storage capacitor is electrically connected to the first node, and a second electrode of the first storage capacitor is electrically connected to the third node; and a second storage capacitor, where a first electrode of the second storage capacitor is electrically connected to the second node, and a second electrode of the second storage capacitor is electrically connected to the third node.

According to one embodiment of the present disclosure, the pixel driving circuit further includes a reset module, and the reset module includes:

a first capacitor, where a first electrode of the first capacitor is electrically connected to the first power signal terminal, and a second electrode of the first capacitor is electrically connected to the third node; and a third transistor, where a gate of the third transistor is electrically connected to a third scan signal terminal, a source of the third transistor is electrically connected to a sensing signal terminal, and a drain of the third transistor is electrically connected to the third node.

According to one embodiment of the present disclosure, the pixel driving circuit further includes a light-emitting control module, the light-emitting control module includes a fourth transistor, a gate of the fourth transistor is electrically connected to a fourth scan signal terminal, a source of the fourth transistor is electrically connected to the first power signal terminal, and a drain of the fourth transistor is electrically connected to the source of the driving transistor.

An embodiment of the present disclosure also provides a display panel including the above-mentioned pixel driving circuit. The pixel driving circuit includes:

a writing module electrically connected to a data signal terminal, and electrically connected to a first node and a second node, where the writing module is configured to connect the data signal terminal to the first node and the second node, or to disconnect the data signal terminal from the first node and the second node;

a driving transistor, where the driving transistor is a double-gate transistor, a first gate of the driving transistor is electrically connected to the first node, a second gate of the driving transistor is electrically connected to the second node, a source of the driving transistor is electrically connected to a first power signal terminal, a drain of the driving transistor is electrically connected to a third node, and the driving transistor is configured to connect the first power signal terminal and the third node, or to disconnect the first power signal terminal from the third node; and a light-emitting element electrically connected to a second power signal terminal, and electrically connected to the third node.

In any one frame period, one of the first gate and the second gate is controlled by a data signal output by the data signal terminal to turn on the driving transistor; and in a plurality of frame periods, the first gate and the second gate are alternately controlled by the data signal to turn on the driving transistor.

According to one embodiment of the present disclosure, the writing module includes:

a first transistor, where a gate of the first transistor is electrically connected to a first scan signal terminal, a source of the first transistor is electrically connected to the data signal terminal, and a drain of the first transistor is electrically connected to the first node; and a second transistor, where a gate of the second transistor is electrically connected to a second scan signal terminal, a source of the second transistor is electrically connected to the data signal terminal, and a drain of the second transistor is electrically connected to the second node.

According to one embodiment of the present disclosure, the first scan signal terminal outputs a first scan signal, the second scan signal terminal outputs a second scan signal, a driving time sequence of the pixel driving circuit includes a data writing stage and a data clearing stage, and the driving time sequence of the pixel driving circuit includes a first driving time sequence and a second driving time sequence;

in the data writing stage of the first driving time sequence, the first scan signal is at a high potential, the second scan signal is at a low potential, the data signal is at the high potential, and the driving transistor is in an on-state; in the data clearing stage of the first driving time sequence, the first scan signal is at the low potential, the second scan signal is at the high potential, the data signal is at the low potential, and the driving transistor is in an off-state;

in the data writing stage of the second driving time sequence, the first scan signal is at the low potential, the second scan signal is at the high potential, the data signal is at the high potential, and the driving transistor is in the on-state; in the data clearing stage of the second driving time sequence, the first scan signal is at the high potential, the second scan signal is at the low potential, the data signal is at the low potential, and the driving transistor is in the off-state; and in any one frame period, the pixel driving circuit is driven in one of the first driving time sequence and the second driving time sequence; and in a plurality of frame periods, the pixel driving circuit is alternately driven in the first driving time sequence and the second driving time sequence.

According to one embodiment of the present disclosure, the pixel driving circuit further includes a storage module, the storage module is electrically connected to the first node, the second node, and the third node, and the storage module is configured to store and maintain a threshold voltage of the driving transistor.

According to one embodiment of the present disclosure, the storage module includes:

a first storage capacitor, where a first electrode of the first storage capacitor is electrically connected to the first node, and a second electrode of the first storage capacitor is electrically connected to the third node; and a second storage capacitor, where a first electrode of the second storage capacitor is electrically connected to the second node, and a second electrode of the second storage capacitor is electrically connected to the third node.

According to one embodiment of the present disclosure, the pixel driving circuit further includes a reset module, and the reset module includes:

a first capacitor, where a first electrode of the first capacitor is electrically connected to the first power signal terminal, and a second electrode of the first capacitor is electrically connected to the third node; and a third transistor, where a gate of the third transistor is electrically connected to a third scan signal terminal, a source of the third transistor is electrically connected to a sensing signal terminal, and a drain of the third transistor is electrically connected to the third node.

Advantages of the embodiments of the present disclosure are as follows. The embodiments of the present disclosure provide the pixel driving circuit, the driving method for the pixel driving circuit, and the display panel. The pixel driving circuit includes the writing module, the driving transistor, and the light-emitting element. The writing module is electrically connected to the data signal terminal, and is electrically connected to the first node and the second node. The writing module is configured to connect the data signal terminal to the first node and the second node, or to disconnect the data signal terminal from the first node and the second node. The driving transistor is the double-gate transistor. The first gate of the driving transistor is electrically connected to the first node. The second gate of the driving transistor is electrically connected to the second node. The source of the driving transistor is electrically connected to the first power signal terminal. The drain of the driving transistor is electrically connected to the third node. The driving transistor is configured to connect the first power signal terminal and the third node, or to disconnect the first power signal terminal and the third node. The light-emitting element is electrically connected to the second power signal terminal and electrically connected to the third node. In any one frame period, one of the first gate and the second gate is controlled by the data signal to turn on the driving transistor. Moreover, in the plurality of frame periods, the first gate and the second gate are alternately controlled by the data signal to turn on the driving transistor. It can prevent long-term voltage application to the same gate from causing some negative electrons in a channel layer to be captured into an interface between the channel layer and a gate insulating layer or directly into the gate insulating layer under the action of a gate voltage. Therefore, it can prevent the threshold voltage from drifting significantly due to long-term voltage application, thereby solving the problem of poor display caused by the drifting of the threshold voltage.

DETAILED DESCRIPTION OF ILLUSTRATED EMBODIMENTS

Figure 1:
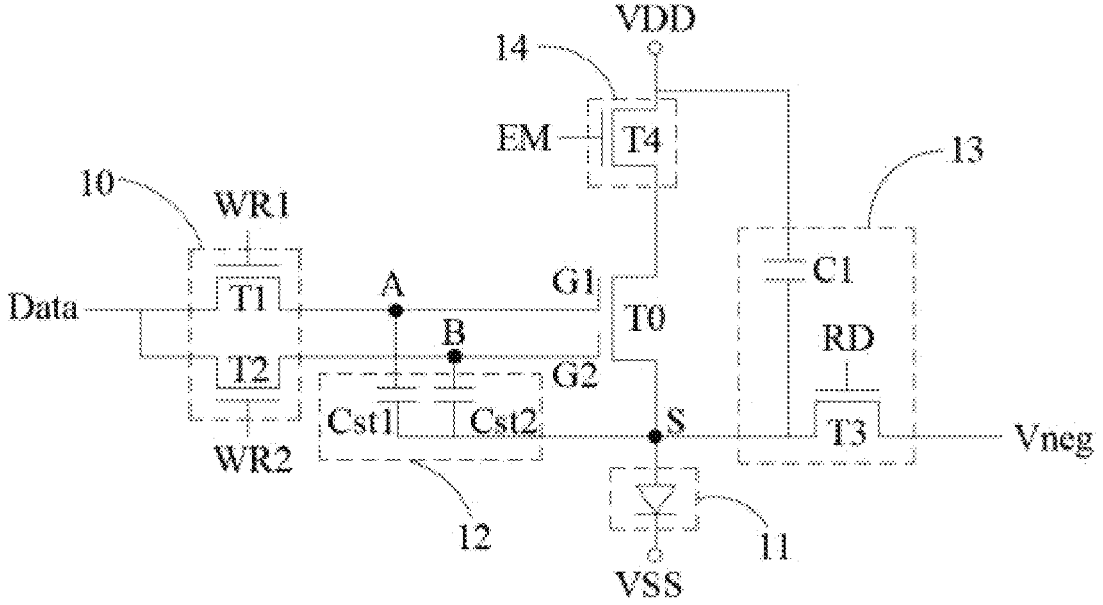
FIG. 1 is a schematic structural diagram of a pixel driving circuit of an embodiment of the present disclosure.

The following description of the embodiments refers to the accompanying drawings to illustrate specific embodiments in which the present disclosure may be implemented. Directional terms, such as upper, lower, front, back, left, right, inner, outer, side, etc., mentioned in the present disclosure only refer to directions of the accompanying drawings. Therefore, the directional terms used are to illustrate and understand the present disclosure, but not to limit the present disclosure. In the drawings, units with similar structures are represented by the same numerals.

The present disclosure will be further described below with reference to the accompanying drawings and specific embodiments.

An embodiment of the present disclosure provides a pixel driving circuit that can prevent a threshold voltage from drifting significantly due to long-term voltage application, thereby solving a problem of poor display caused by the drifting of the threshold voltage.

As shown in FIG. 1, which is a schematic structural diagram of a pixel driving circuit of an embodiment of the present disclosure. The pixel driving circuit includes a writing module 10, a driving transistor TO, and a light-emitting element 11. The writing module 10 is electrically connected to a data signal terminal Data, and is also electrically connected to a first node A and a second node B. The writing module 10 is configured to connect the data signal terminal Data to the first node A and the second node B, or to disconnect the data signal terminal Data from the first node A or the second node B.

For example, the writing module 10 can connect the data signal terminal Data and the first node A under a control of a scan signal, so as to transmit a data signal output by the data signal terminal Data to the first node A through the data writing module 10. The writing module 10 can also disconnect the data signal terminal Data from the first node A under the control of the scan signal. At this time, the first node A cannot receive the data signal output by the data signal terminal Data. The writing module 10 can selectively connect the data signal terminal Data to one of the first node A and the second node B under the control of the scan signal, and disconnect the connection between the data signal terminal Data and the other one of the first node A and the second node B under the control of the scan signal. The writing module 10 can also disconnect the connection between the data signal terminal Data and the first node A and the connection between the data signal terminal Data and the second node B at the same time under the control of the scan signal. Alternatively, the writing module 10 can also connect the data signal terminal Data to the first node A and the second node B simultaneously under the control of the scan signal.

The driving transistor T0 is a double-gate transistor. A first gate G1 of the driving transistor T0 is electrically connected to the first node A. A second gate G2 of the driving transistor T0 is electrically connected to the second node B. A source of driving transistor T0 is electrically connected to a first power signal terminal VDD. A drain of driving transistor T0 is electrically connected to a third node S. The driving transistor T0 is configured to connect the first power signal terminal VDD and the third node S, or to disconnect the first power signal terminal VDD from the third node S. For example, the driving transistor T0 can connect the first power signal terminal VDD and the third node S under the control of the data signal, so that a first power signal output by the first power signal terminal VDD is transmitted to the third node S through the driving transistor T0. The driving transistor T0 can also disconnect the first power signal terminal VDD from the third node S under the control of the data signal.

In some embodiments of the present disclosure, the driving transistor T0 is a metal oxide semiconductor thin film transistor. A material of a semiconductor layer of the driving transistor can be selected from any one of Indium Gallium Zinc Oxide (IGZO), Indium Zinc Oxide (IZO), Indium Gallium Zinc Tin Oxide (IGZTO), etc. A film layer structure of the driving transistor T0 can refer to a film layer structure of the transistor of the existing display panel, and is not limited herewith.

The light-emitting element 11 is electrically connected to a second power signal terminal VSS and electrically connected to the third node S. When a circuit between the first power signal terminal VDD and the second power signal terminal VSS is turned on, the light-emitting element 11 emits light.

In some embodiments of the present disclosure, the light-emitting element 11 is a micro light-emitting diode (Mirco LED) chip. A size of the Micro LED chip is less than 100 micrometers. In practical applications, a type of the light-emitting element 11 is not limited to the Micro LED chip as the above embodiment, but can also be a mini light-emitting diode (Mini LED) or an organic light-emitting diode (OLED).

As shown in FIG. 1, in any one frame period, one of the first gate G1 and the second gate G2 is controlled by the data signal to turn on the driving transistor T0. In a plurality of frame periods, the first gate G1 and the second gate G2 are alternately controlled by the data signal to turn on the driving transistor T0. For example, the driving transistor T0 can be turned on alternately through the first gate G1 and the second gate G2 every N frames. The number of N can be 10, 30, 50, 70 or 100, etc., there is no limit here. Under this structure, the first gate G1 and the second gate G2 are alternately controlled to turn on the driving transistor T0. This can prevent long-term voltage application to the same gate from causing some negative electrons in a channel layer to be captured into an interface between the channel layer and a gate insulating layer or directly into the gate insulating layer under the action of a gate voltage. Therefore, it is possible to prevent a threshold voltage of the driving transistor from significantly drifting due to long-term pressurization, thereby solving the problem of poor display caused by the drifting of the threshold voltage.

In some embodiments of the present disclosure, the writing module 10 includes a first transistor T1 and a second transistor T2. A gate of the first transistor T1 is electrically connected to a first scan signal terminal WR1. A source of the first transistor T1 is electrically connected to the data signal terminal Data. A drain of the first transistor T1 is electrically connected to the first node A. A first scan signal output by the first scan signal terminal WR1 can control the turning on and off of the first transistor T1. A gate of the second transistor T2 is electrically connected to a second scan signal terminal WR2. A source of the second transistor T2 is electrically connected to the data signal terminal Data. A drain of the second transistor T2 is electrically connected to the second node B. A second scan signal output by the second scan signal terminal WR2 can control the turning on and off of the second transistor T2.

In some embodiments of the present disclosure, a driving time sequence of the pixel driving circuit includes a data writing stage and a data clearing stage. The driving time sequence of the driving circuit includes a first driving time sequence and a second driving time sequence. Both the first driving time sequence and the second driving time sequence have a complete one frame period.

As shown in FIG. 1, in the data writing stage of the first driving time sequence, the first scan signal is at a high potential and the second scan signal is at a low potential. The first transistor T1 is turned on by the first scan signal. The second transistor T2 is turned off under the control of the second scan signal. The first transistor T1 outputs the data signal to the first node A, and the data signal is at the high potential. The first gate G1 is controlled by the data signal to turn on the driving transistor T0, so that the driving transistor T0 is in an on-state in the data writing stage of the first driving time sequence, thereby charging the first gate G1, that is, the first node A. In the data clearing stage of the first driving time sequence, the first scan signal is at the low potential and the second scan signal is at the high potential. The first transistor T1 is turned off under the control of the first scan signal. The second transistor T2 is turned on by the second scan signal. The second transistor T2 outputs the data signal to the second node B, and the data signal is at the low potential. The second gate G2 is controlled by the data signal to turn off the driving transistor T0, so that the driving transistor is in an off-state in the data clearing stage of the first driving time sequence, thereby clearing the voltage at the second gate G2, that is, the second node B.

In the data writing stage of the second driving time sequence, the first scan signal is at the low potential and the second scan signal is at the high potential. The first transistor T1 is turned off under the control of the first scan signal. The second transistor T2 is turned on by the second scan signal. The second transistor T2 outputs the data signal to the second node B, and the data signal is at the high potential. The second gate G2 is controlled by the data signal to turn on the driving transistor T0 to charge the second gate G2, that is, the second node B. In the data clearing stage of the second driving time sequence, the first scan signal is at the high potential and the second scan signal is at the low potential. The first transistor T1 is turned on by the first scan signal. The second transistor T2 is turned off under the control of the second scan signal. The first transistor T1 outputs the data signal to the first node A, and the data signal is at the low potential. The first gate G1 is controlled by the data signal to turn off the driving transistor T0, so that the driving transistor is in the off-state in the data clearing stage of the second driving time sequence, thus clearing the voltage at the first gate G1, that is, the first node A.

In some embodiments of the present disclosure, in any one frame period, the pixel driving circuit is driven by one of the first driving time sequence and the second driving time sequence. In a plurality of frame periods, the pixel driving circuit is alternately driven by the first driving time sequence and the second driving time sequence. This can prevent the threshold voltage of the driving transistor from drifting significantly due to long-term pressurization, thereby solving the problem of poor display caused by the drifting of the threshold voltage.

In some embodiments of the present disclosure, the pixel driving circuit further includes a storage module 12. The storage module 12 is electrically connected to the first node A, the second node B, and the third node S. The storage module 12 is configured to store and maintain the threshold voltage of the driving transistor 10.

In one embodiment, as shown in FIG. 1, the storage module 12 includes a first storage capacitor Cst1 and a second storage capacitor Cst2. A first electrode of the first storage capacitor Cst1 is electrically connected to the first node A. A second electrode of the first storage capacitor Cst1 is electrically connected to the third node S. A first electrode of the second storage capacitor Cst2 is electrically connected to the second node B. A second electrode of the second storage capacitor Cst2 is electrically connected to the third node S.

The driving time sequence of the pixel driving circuit also includes a threshold voltage acquisition and storage stage and a light-emitting stage. In the threshold voltage acquisition and storage stage of the first driving time sequence, the first storage capacitor Cst1 is configured to store the threshold voltage of the driving transistor T0. Also, in the light-emitting stage of the first driving time sequence, the first storage capacitor Cst1 is configured to maintain a voltage difference between the first node A and the third node S, so that the driving transistor T0 keeps in the on-state, so that the light-emitting element 11 emits light. In the threshold voltage acquisition and storage stage of the second driving time sequence, the second storage capacitor Cst2 is configured to store the threshold voltage of the driving transistor T0. Also, in the light-emitting stage of the second driving time sequence, the second storage capacitor Cst2 is configured to maintain a voltage difference between the second node B and the third node S, so that the driving transistor T0 keeps in the on-state, so that the light-emitting element 11 emits light.

As shown in FIG. 1, the pixel driving circuit also includes a reset module 13. The reset module 13 includes a first capacitor C1 and a third transistor T3. A first electrode of the first capacitor C1 is electrically connected to the first power signal terminal VDD. A second electrode of the first capacitor C1 is electrically connected to the third node S. A gate of the third transistor T3 is electrically connected to a third scan signal terminal RD. A source of the third transistor T3 is electrically connected to a sensing signal terminal Vneg. A drain of the third transistor T3 is electrically connected to the third node S.

The driving time sequence of the pixel driving circuit also includes an initialization stage. In the initialization stage, a third scan signal output by the third scan signal terminal RD is at the high potential. The third transistor T3 is turned on by the third scan signal. A voltage of the third node S is the same as a voltage of the sensing signal terminal Vneg.

As shown in FIG. 1, the pixel driving circuit also includes a light-emitting control module 14. The light-emitting control module 14 includes a fourth transistor T4. A gate of the fourth transistor T4 is electrically connected to a fourth scan signal terminal EM. A source of the fourth transistor T4 is electrically connected to the first power signal terminal VDD. A drain of the fourth transistor T4 is electrically connected to the source of the driving transistor T0. By setting the light-emitting control module 14 between the driving transistor T0 and the first power signal terminal VDD, the driving transistor T0 can be prevented from being accidentally turned on during the data writing stage to output the first power signal to the third node S to cause the light-emitting element 11 to emit light.

In the threshold voltage acquisition and storage stage, the third scan signal output by the third scan signal terminal RD is at the low potential. The third transistor T3 is turned off under the control of the third scan signal, and the driving transistor T0 is turned off. The fourth scan signal output by the fourth scan signal terminal EM is at the high potential. The fourth transistor T4 is turned on by the fourth scan signal. The third node S is charged until its voltage is equal to a voltage difference between the first node or the second node and the threshold voltage of the driving transistor T0, thereby realizing the acquisition and storage of the threshold voltage of the driving transistor T0.

In some embodiments of the present disclosure, the first transistor T1, the second transistor T2, the third transistor T3, and the fourth transistor T4 are all N-type low-temperature polysilicon thin film transistors.

Figure 2:
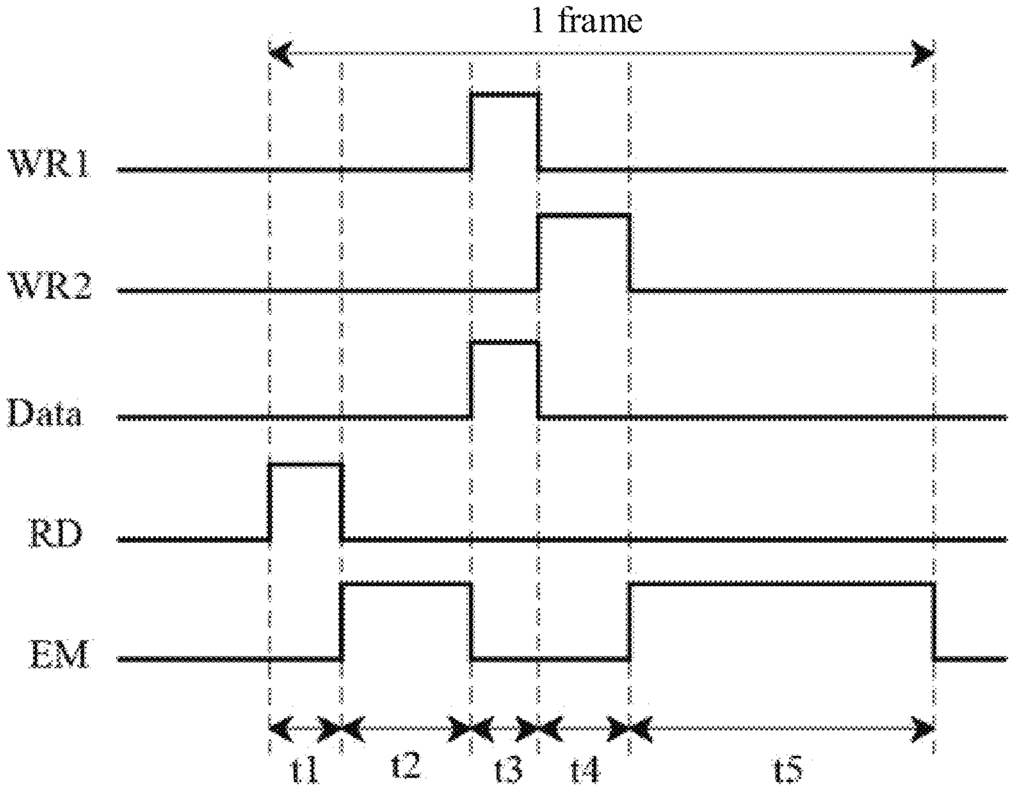
FIG. 2 is a driving timing diagram of a first driving time sequence of the pixel driving circuit of an embodiment of the present disclosure.

According to the pixel driving circuit provided in the above embodiments of the present disclosure, embodiments of the present disclosure also provide a driving method of the pixel driving circuit. The driving method is adapted to be configured as the pixel driving circuit provided in any of the above embodiments. As shown in FIG. 2, a driving time sequence of the driving method includes an initialization stage t1, a threshold voltage acquisition and storage stage t2, a data writing stage t3, a data clearing stage t4, and a light-emitting stage t5. In the initialization stage t1, the first node A, the second node B, and the third node S are reset. In the threshold voltage acquisition and storage stage t2, the third node S is charged until the voltage difference between the first node A or the second node B and the third node S is equal to the threshold voltage of the driving transistor T0. In the data writing stage t3, the writing module 10 outputs the data signal to one of the first node A and the second node B. One of the first gate G1 and the second gate G2 is controlled by the data signal to turn on the driving transistor T0. In the data clearing stage t4, the writing module 10 outputs the data signal to the other one of the first node A and the second node B. The other one of the first gate G1 and the second gate G2 is controlled by the data signal to turn off the driving transistor T0. In the light-emitting stage t5, the light-emitting element 11 emits light.

In any one frame period, one of the first gate G1 and the second gate G2 is controlled by the data signal to turn on the driving transistor T0. In a plurality of frame periods, the first gate G1 and the second gate G2 are alternately controlled by the data signal to turn on the driving transistor T0.

In the embodiment of the present disclosure, the driving time sequence of the driving method includes the first driving time sequence and the second driving time sequence. In the data writing stage t3 of the first driving time sequence, the writing module 10 connects the data signal terminal Data and the first node A. The data signal terminal Data outputs the data signal to the first node A. The data signal is at the high potential. The first gate G1 is controlled by the data signal to turn on the driving transistor T0. The writing module 10 disconnects the data signal terminal Data from the second node B. In the data clearing stage t4 of the first driving time sequence, the writing module 10 connects the data signal terminal Data and the second node B. The data signal terminal Data outputs the data signal to the second node B. The data signal is at the low potential. The second gate G2 is controlled by the data signal to turn off the driving transistor T0. The writing module 10 disconnects the data signal terminal Data from the first node A. In the data writing stage t3 of the second driving time sequence, the writing module 10 connects the data signal terminal Data and the second node B. The data signal terminal Data outputs the data signal to the second node B. The data signal is at the high potential. The second gate G2 is controlled by the data signal to turn on the driving transistor T0. The writing module 10 disconnects the data signal terminal Data from the first node A. In the data clearing stage t4 of the second driving time sequence, the writing module 10 connects the data signal terminal Data and the first node A. The data signal terminal Data outputs the data signal to the first node A. The data signal is at the low potential. The first gate G1 is controlled by the data signal to turn off the driving transistor T0. The writing module 10 disconnects the data signal terminal Data from the second node B.

In some embodiments of the present disclosure, in any one frame period, one of the first driving time sequence and the second driving time sequence is used to drive the pixel driving circuit. In a plurality of frame periods, the first driving time sequence and the second driving time sequence are alternately used to drive the pixel driving circuit. This can prevent the threshold voltage from drifting significantly due to long-term voltage application, thereby solving the problem of poor display caused by the drifting of the threshold voltage.

In some embodiments of the present disclosure, the first driving time sequence and the second driving time sequence are alternated every 100 frames. For example, in frames 1 to 100, the pixel driving circuit is driven in the first driving time sequence. In frames 101 to 200, the pixel circuit is driven in the second driving time sequence. In frames 201 to 300, the pixel driving circuit is driven in the first driving time sequence. In frames 301 to 400, the pixel driving circuit is driven in the second driving time sequence. The following analogy will not be repeated. In practical applications, the first driving time sequence and the second driving time sequence can be alternated every 1 frame, 10 frames, 20 frames, or more than 20 frames, which is not limited here.

Figure 3:
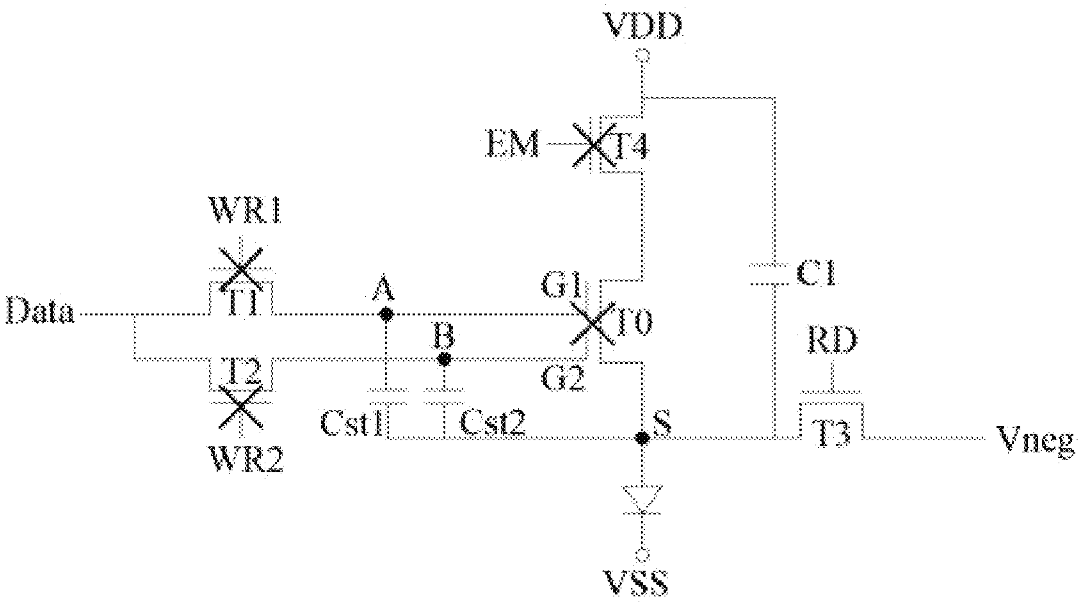
FIG. 3 is a schematic diagram showing turning on and off on each transistor in an initialization stage of the first driving time sequence of the pixel driving circuit of an embodiment of the present disclosure.

Taking the first driving time sequence as an example, refer to FIG. 2 to FIG. 7. FIG. 2 is a driving timing diagram of a first driving time sequence of the pixel driving circuit of an embodiment of the present disclosure, and the details are as follows:

Referring to FIG. 2 and FIG. 3, FIG. 3 is a schematic diagram showing turning on and off on each transistor in an initialization stage of the first driving time sequence of the pixel driving circuit of an embodiment of the present disclosure. In the initialization stage t1, the first scan signal, the second scan signal, the data signal, and the fourth scan signal are all at the low potential. The third scan signal is at the high potential. The driving transistor T0, the first transistor T1, the second transistor T2, and the fourth transistor T4 are all turned off. The third transistor T3 is turned on. A potential $V_{G1}$ of the first gate and a potential $V_{G2}$ of the second gate are both equal to a precharge potential $V_{pre}$, that is, $V_{G1}=V_{G2}=V_{pre}$. A potential $V_s$ of the third node S is equal to a potential $V_{neg}$ of the sensing signal of the sensing signal terminal, that is, $V_s=V_{neg}$. Through the initialization stage, the potentials at the first gate G1 (i.e., the first node A), the second gate G2 (i.e., the second node B), and third node S can be cleared.

Figure 4:
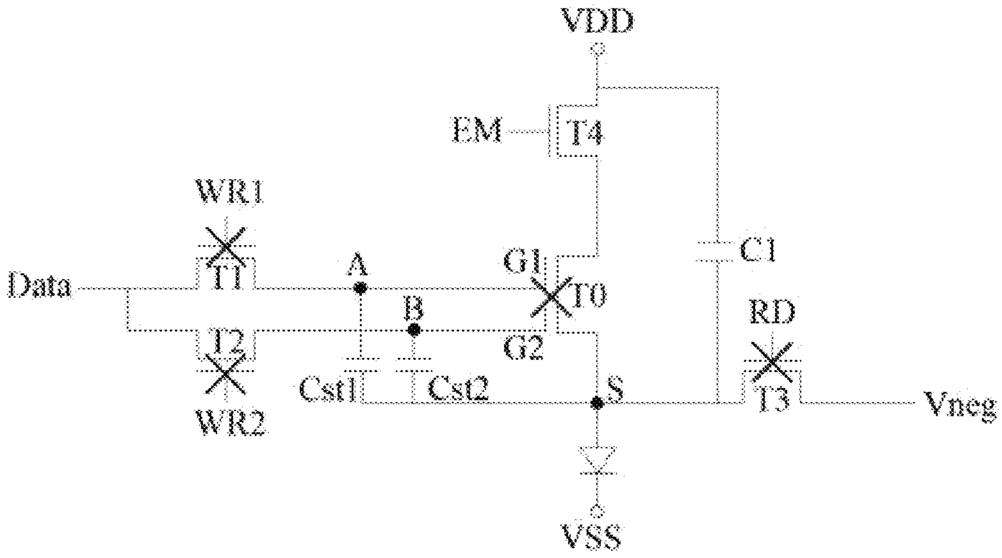
FIG. 4 is a schematic diagram showing turning on and off on each transistor in a threshold voltage acquisition and storage stage of the first driving time sequence of the pixel driving circuit of an embodiment of the present disclosure.

Referring to FIG. 2 and FIG. 4, FIG. 4 is a schematic diagram showing turning on and off on each transistor in a threshold voltage acquisition and storage stage of the first driving time sequence of the pixel driving circuit of an embodiment of the present disclosure. In threshold voltage acquisition and storage stage t2, the first scan signal, the second scan signal, the data signal, and the third scan signal are all at the low potential. The fourth scan signal is at the high potential. The driving transistor T0, the first transistor T1, the second transistor T2, and the third transistor T3 are all turned off. The fourth transistor T4 is turned on. The potential $V_s$ of the third node S is charged until the voltage difference between the first node A or the second node B and the third node S is equal to the threshold voltage $V_{th}$ of the driving transistor T0, that is, $V_s=V_{pre}-V_{th}$. The potential $V_{G1}$ of the first gate and the potential $V_{G2}$ of the second gate are still equal to the precharge potential $V_{pre}$, that is, $V_{G1}=V_{G2}=V_{pre}$. Through the threshold voltage acquisition and storage stage t2, the threshold voltage $V_{th}$ of the driving transistor T0 can be read and stored.

Figure 5:
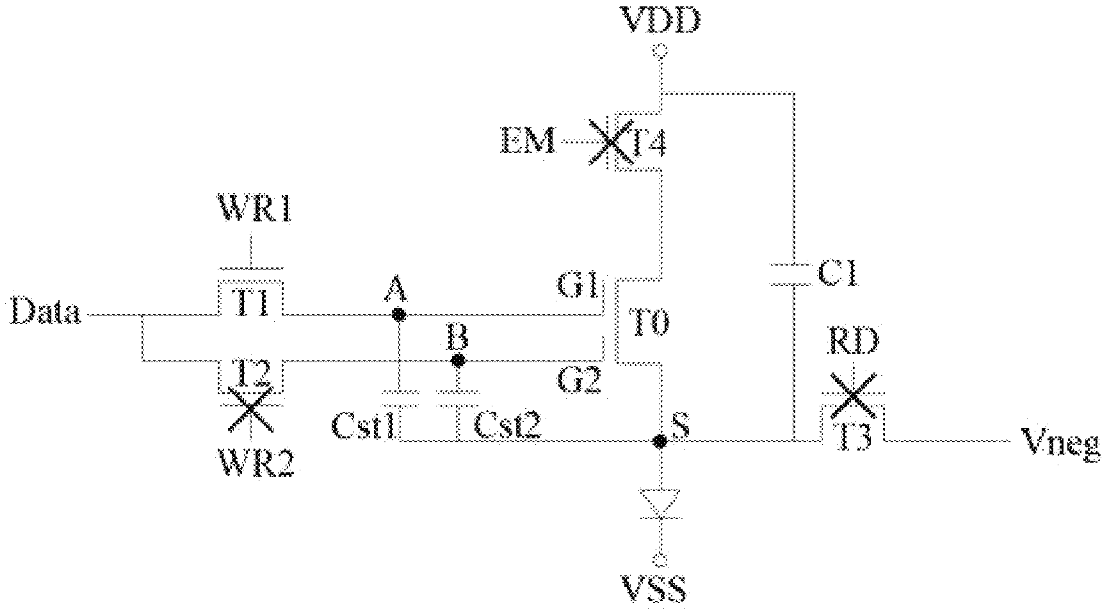
FIG. 5 is a schematic diagram showing turning on and off on each transistor in a data writing stage of the first driving time sequence of the pixel driving circuit of an embodiment of the present disclosure.

Referring to FIG. 2 and FIG. 5, FIG. 5 is a schematic diagram showing turning on and off on each transistor in a data writing stage of the first driving time sequence of the pixel driving circuit of an embodiment of the present disclosure. In the data writing stage t3, the first scan signal is at the high potential and the data signal is at the high potential. The first transistor T1 is turned on. The potential $V_{G1}$ of the first gate G1 is the same as the potential $V_{data}$ of the data signal, that is, $V_{G1}=V_{data}$, so that the driving transistor T0 can be turned on. A capacitive coupling of the first storage capacitor Cst1 increases the potential $V_s$ of the third node S, that is, $V_s=(V_{pre}-V_{th})+(V_{data}-V_{pre})*C_{st1}/(C_1+C_{st1}+C_{st2})$. The voltage between the first gate G1 and the third node S is $V_{g1s}(V_{data}-V_{pre})*(C_{st2}+C_1)/(C_1+C_{st1}+C_{st2})+V_{th}$. Through the data writing stage t3, the target voltage required by the light-emitting element 11 can be set.

Figure 6:
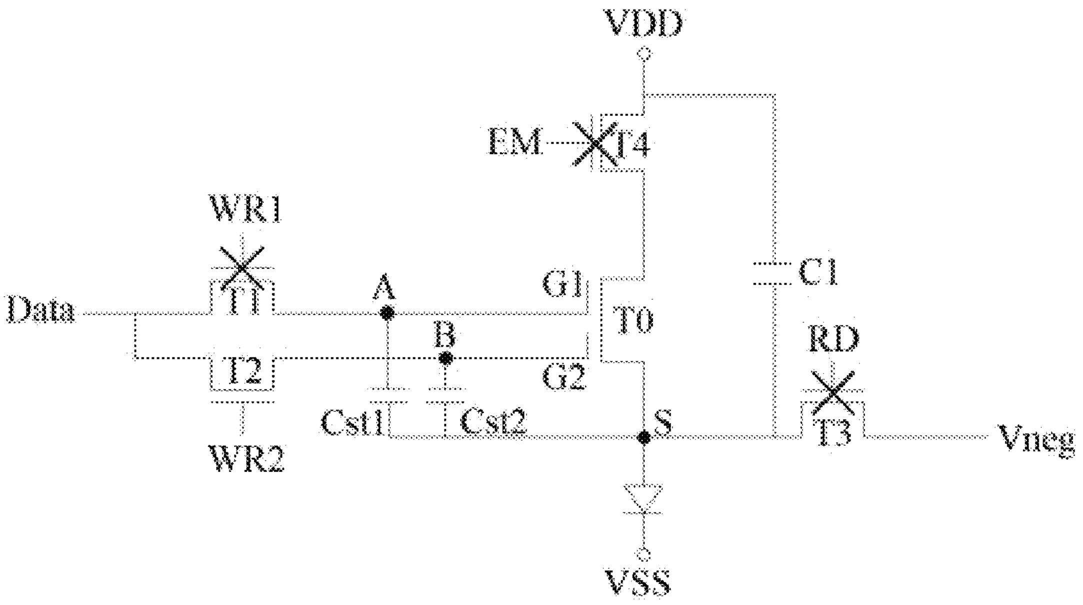
FIG. 6 is a schematic diagram showing turning on and off on each transistor in a data clearing stage of the first driving time sequence of the pixel driving circuit of an embodiment of the present disclosure.

Referring to FIG. 2 and FIG. 6, FIG. 6 is a schematic diagram showing turning on and off on each transistor in a data clearing stage of the first driving time sequence of the pixel driving circuit of an embodiment of the present disclosure. In the data clearing stage t4, the second scan signal is at the high potential. The data signal, the first scan signal, the third scan signal, and the fourth scan signal are all at the low potential. The second transistor T2 is turned on. Since the data signal is at the low potential, the driving transistor T0 cannot be turned on. Due to the capacitive coupling of the second storage capacitor $C_{st2}$ in the data writing stage t3, in the data clearing stage t4, the voltage between the second gate G2 and the third node S is $V_{g2s}=(V_{data}-V_{pre})*(C_{st2}+C_1)/(C_1+C_{st1}+C_{st2})+V_{th}$. Through the data clearing stage t4, the potential at the second gate G2 can be cleared.

Figure 7:
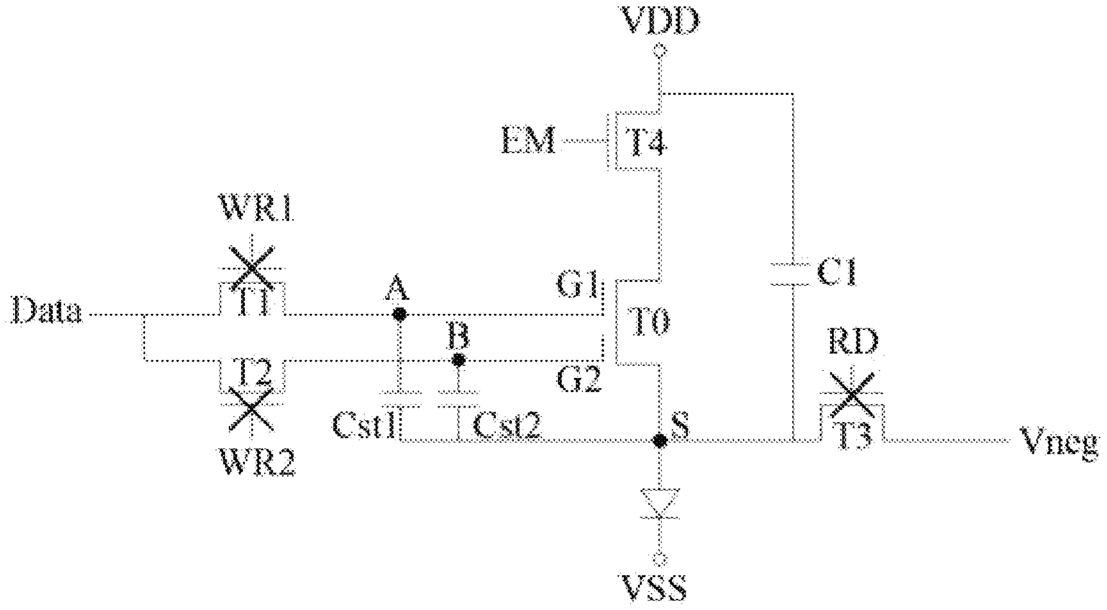
FIG. 7 is a schematic diagram showing turning on and off on each transistor in a light-emitting stage of the first driving time sequence of the pixel driving circuit of an embodiment of the present disclosure.

Referring to FIG. 2 and FIG. 7, FIG. 7 is a schematic diagram showing turning on and off on each transistor in a light-emitting stage of the first driving time sequence of the pixel driving circuit of an embodiment of the present disclosure. In the light-emitting stage t5, the first scan signal, the second scan signal, the data signal, and the third scan signal are all at the low potential. The fourth scan signal is at the high potential. The first transistor T1, the second transistor T2, and the third transistor T3 are all turned off. The fourth transistor T4 is turned on. The first storage capacitor $C_{st1}$ maintains the voltage difference between the first gate G1 and the third node S, causing the driving transistor T0 to turn on. The potential at the third node S is $V_s=V_{led}+VSS$, where Vied is a potential of an anode of the light-emitting element 11. The potential at the first gate G1 is $V_{G1}=V_{data}+V_{led}+VSS-(V_{pre}-V_{th})-(V_{data}-V_{pre})*C_{st1}/(C_1+C_{st1}+C_{st2})$. The voltage difference between a voltage between the first gate G1 and the third node S and the threshold voltage $V_{th}$ is: $V_{g1s}-V_{th}=V_{data}-V_{pre}-(V_{data}-V_{pre})*C_{st1}/(C_1+C_{st1}+C_{st2})$.

It should be noted that the above embodiment only takes the first driving time sequence as an example. The second driving time sequence can refer to the first driving time sequence to drive the pixel driving circuit, which will not be described again here.

The pixel driving circuit provided in the above embodiments is provided according to the present disclosure. An embodiment of the present disclosure also provides a display panel. The display device includes the pixel driving circuit provided in any of the above embodiments. The display panel can be applied to, but is not limited to, display devices such as smartphones, smart watches, desktop computers, laptops, and televisions.

Advantages of the embodiments of the present disclosure are as follows. The embodiments of the present disclosure provide the pixel driving circuit, the driving method for the pixel driving circuit, and the display panel. The pixel driving circuit includes the writing module, the driving transistor, and the light-emitting element. The writing module is electrically connected to the data signal terminal, and is electrically connected to the first node and the second node. The writing module is configured to transmit the data signal output by the data signal terminal to the first node and the second node. The driving transistor is the double-gate transistor. The first gate of the driving transistor is electrically connected to the first node. The second gate of the driving transistor is electrically connected to the second node. The source of the driving transistor is electrically connected to the first power signal terminal. The drain of the driving transistor is electrically connected to the third node. The driving transistor is configured to transmit the first power signal output from the first power signal terminal to the third node. The light-emitting element is electrically connected to the second power signal terminal and electrically connected to the third node. In any one frame period, one of the first gate and the second gate is controlled by the data signal to turn on the driving transistor. Moreover, in the plurality of frame periods, the first gate and the second gate are alternately controlled by the data signal to turn on the driving transistor. It can prevent long-term voltage application to the same gate from causing some negative electrons in a channel layer to be captured into an interface between the channel layer and a gate insulating layer or directly into the gate insulating layer under the action of a gate voltage. Therefore, it can prevent the threshold voltage from drifting significantly due to long-term voltage application, thereby solving the problem of poor display caused by the drifting of the threshold voltage.

In summary, although the present disclosure is disclosed as above in preferred embodiments, the above preferred embodiments are not intended to limit the present disclosure. Those of ordinary skill in the art can make various changes and modifications without departing from the spirit and scope of the present disclosure. Therefore, the protection scope of the present disclosure is based on the scope defined by the claims.

What is claimed is:

1. A pixel driving circuit, comprising:

a writing module electrically connected to a data signal terminal, and electrically connected to a first node and a second node, wherein the writing module is configured to connect the data signal terminal to one of the first node and the second node and disconnect the data signal terminal from another of the first node and the second node, or to disconnect the data signal terminal from the first node and the second node, or connect the data signal terminal to both the first node and the second node;

a driving transistor, wherein the driving transistor is a double-gate transistor, a first gate of the driving transistor is electrically connected to the first node, a second gate of the driving transistor is electrically connected to the second node, a source of the driving transistor is electrically connected to a first power signal terminal, a drain of the driving transistor is electrically connected to a third node, and the driving transistor is configured to connect the first power signal terminal and the third node, or to disconnect the first power signal terminal from the third node; and a light-emitting element electrically connected to a second power signal terminal, and electrically connected to the third node;

wherein in any one frame period, one of the first gate and the second gate is controlled by a data signal output by the data signal terminal to turn on the driving transistor; and in a plurality of frame periods, the first gate and the second gate are alternately controlled by the data signal to turn on the driving transistor;

wherein the writing module comprises:

a first transistor, wherein a gate of the first transistor is electrically connected to a first scan signal terminal, a source of the first transistor is electrically connected to the data signal terminal, and a drain of the first transistor is electrically connected to the first node; and a second transistor, wherein a gate of the second transistor is electrically connected to a second scan signal terminal, a source of the second transistor is electrically connected to the data signal terminal, and a drain of the second transistor is electrically connected to the second node;

wherein the pixel driving circuit further comprises a reset module, and the reset module comprises:

a first capacitor, wherein a first electrode of the first capacitor is electrically connected to the first power signal terminal, and a second electrode of the first capacitor is electrically connected to the third node; and a third transistor, wherein a gate of the third transistor is electrically connected to a third scan signal terminal, a source of the third transistor is electrically connected to a sensing signal terminal, and a drain of the third transistor is electrically connected to the third node.

2. The pixel driving circuit of claim 1, wherein the first scan signal terminal outputs a first scan signal, the second scan signal terminal outputs a second scan signal, a driving time sequence of the pixel driving circuit comprises a data writing stage and a data clearing stage, and the driving time sequence of the pixel driving circuit comprises a first driving time sequence and a second driving time sequence;

in the data writing stage of the first driving time sequence, the first scan signal is at a high potential, the second scan signal is at a low potential, the data signal is at the high potential, and the driving transistor is in an on-state; in the data clearing stage of the first driving time sequence, the first scan signal is at the low potential, the second scan signal is at the high potential, the data signal is at the low potential, and the driving transistor is in an off-state;

in the data writing stage of the second driving time sequence, the first scan signal is at the low potential, the second scan signal is at the high potential, the data signal is at the high potential, and the driving transistor is in the on-state; in the data clearing stage of the second driving time sequence, the first scan signal is at the high potential, the second scan signal is at the low potential, the data signal is at the low potential, and the driving transistor is in the off-state; and in any one frame period, the pixel driving circuit is driven in one of the first driving time sequence and the second driving time sequence; and in a plurality of frame periods, the pixel driving circuit is alternately driven in the first driving time sequence and the second driving time sequence.

3. The pixel driving circuit of claim 1, further comprising a storage module, wherein the storage module is electrically connected to the first node, the second node, and the third node, and the storage module is configured to store and maintain a threshold voltage of the driving transistor.

4. The pixel driving circuit of claim 3, wherein the storage module comprises:

a first storage capacitor, wherein a first electrode of the first storage capacitor is electrically connected to the first node, and a second electrode of the first storage capacitor is electrically connected to the third node; and a second storage capacitor, wherein a first electrode of the second storage capacitor is electrically connected to the second node, and a second electrode of the second storage capacitor is electrically connected to the third node.

5. The pixel driving circuit of claim 1, further comprising a light-emitting control module, wherein the light-emitting control module comprises a fourth transistor, a gate of the fourth transistor is electrically connected to a fourth scan signal terminal, a source of the fourth transistor is electrically connected to the first power signal terminal, and a drain of the fourth transistor is electrically connected to the source of the driving transistor.

6. A driving method for driving the pixel driving circuit of claim 1, wherein a driving time sequence of the driving method comprises:

an initialization stage for resetting the first node, the second node, and the third node;

a threshold voltage acquisition and storage stage for charging the third node until a voltage difference between the first node or the second node and the third node is equal to the threshold voltage of the driving transistor;

a data writing stage for outputting, by the writing module, the data signal to one of the first node and the second node, wherein one of the first gate and the second gate is controlled by the data signal to turn on the driving transistor;

a data clearing stage for outputting, by the writing module, the data signal to the other one of the first node and the second node, wherein the other one of the first gate and the second gate is controlled by the data signal to turn off the driving transistor; and a light-emitting stage for causing the light-emitting element to emit light;

wherein in any one frame period, one of the first gate and the second gate is controlled by the data signal to turn on the driving transistor; and in a plurality of frame periods, the first gate and the second gate are alternately controlled by the data signal to turn on the driving transistor.

7. The driving method of claim 6, wherein the driving time sequence of the driving method comprises a first driving time sequence and a second driving time sequence;

in the data writing stage of the first driving time sequence, the writing module connects the data signal terminal and the first node, the data signal terminal outputs the data signal to the first node, the data signal is at a high potential, and the first gate is controlled by of the data signal to turn on the driving transistor; in the data clearing stage of the first driving time sequence, the writing module connects the data signal terminal and the second node, the data signal terminal outputs the data signal to the second node, the data signal is at a low potential, and the second gate is controlled by the data signal to turn off the driving transistor;

in the data writing stage of the second driving time sequence, the writing module connects the data signal terminal and the second node, the data signal terminal outputs the data signal to the second node, the data signal is at the high potential, and the second gate is controlled by of the data signal to turn on the driving transistor; in the data clearing stage of the second driving time sequence, the writing module connects the data signal terminal and the first node, the data signal terminal outputs the data signal to the first node, the data signal is at the low potential, and the first gate is controlled by the data signal to turn off the driving transistor; and in any one frame period, the pixel driving circuit is driven in one of the first driving time sequence and the second driving time sequence; and in a plurality of frame periods, the pixel driving circuit is alternately driven in the first driving time sequence and the second driving time sequence.

8. The driving method of claim 6, wherein the writing module comprises:

a first transistor, wherein a gate of the first transistor is electrically connected to a first scan signal terminal, a source of the first transistor is electrically connected to the data signal terminal, and a drain of the first transistor is electrically connected to the first node; and a second transistor, wherein a gate of the second transistor is electrically connected to a second scan signal terminal, a source of the second transistor is electrically connected to the data signal terminal, and a drain of the second transistor is electrically connected to the second node.

9. The driving method of claim 6, wherein the pixel driving circuit further comprises a storage module, the storage module is electrically connected to the first node, the second node, and the third node, and the storage module is configured to store and maintain a threshold voltage of the driving transistor.

10. The driving method of claim 9, wherein the storage module comprises:

a first storage capacitor, wherein a first electrode of the first storage capacitor is electrically connected to the first node, and a second electrode of the first storage capacitor is electrically connected to the third node; and a second storage capacitor, wherein a first electrode of the second storage capacitor is electrically connected to the second node, and a second electrode of the second storage capacitor is electrically connected to the third node.

11. The driving method of claim 6, wherein the pixel driving circuit further comprises a reset module, and the reset module comprises:

a first capacitor, wherein a first electrode of the first capacitor is electrically connected to the first power signal terminal, and a second electrode of the first capacitor is electrically connected to the third node; and a third transistor, wherein a gate of the third transistor is electrically connected to a third scan signal terminal, a source of the third transistor is electrically connected to a sensing signal terminal, and a drain of the third transistor is electrically connected to the third node.

12. The driving method of claim 6, wherein the pixel driving circuit further comprises a light-emitting control module, the light-emitting control module comprises a fourth transistor, a gate of the fourth transistor is electrically connected to a fourth scan signal terminal, a source of the fourth transistor is electrically connected to the first power signal terminal, and a drain of the fourth transistor is electrically connected to the source of the driving transistor.

13. A display panel, comprising a pixel driving circuit, wherein the pixel driving circuit comprises:

a writing module electrically connected to a data signal terminal, and electrically connected to a first node and a second node, wherein the writing module is configured to connect the data signal terminal to one of the first node and the second node and disconnect the data signal terminal from another of the first node and the second node, or to disconnect the data signal terminal from the first node and the second node, or connect the data signal terminal to both the first node and the second node;

a driving transistor, wherein the driving transistor is a double-gate transistor, a first gate of the driving transistor is electrically connected to the first node, a second gate of the driving transistor is electrically connected to the second node, a source of the driving transistor is electrically connected to a first power signal terminal, a drain of the driving transistor is electrically connected to a third node, and the driving transistor is configured to connect the first power signal terminal and the third node, or to disconnect the first power signal terminal from the third node; and a light-emitting element electrically connected to a second power signal terminal, and electrically connected to the third node;

wherein in any one frame period, one of the first gate and the second gate is controlled by a data signal output by the data signal terminal to turn on the driving transistor; and in a plurality of frame periods, the first gate and the second gate are alternately controlled by the data signal to turn on the driving transistor;

wherein the writing module comprises:

a first transistor, wherein a gate of the first transistor is electrically connected to a first scan signal terminal, a source of the first transistor is electrically connected to the data signal terminal, and a drain of the first transistor is electrically connected to the first node; and a second transistor, wherein a gate of the second transistor is electrically connected to a second scan signal terminal, a source of the second transistor is electrically connected to the data signal terminal, and a drain of the second transistor is electrically connected to the second node;

wherein the pixel driving circuit further comprises a reset module, and the reset module comprises:

a first capacitor, wherein a first electrode of the first capacitor is electrically connected to the first power signal terminal, and a second electrode of the first capacitor is electrically connected to the third node; and a third transistor, wherein a gate of the third transistor is electrically connected to a third scan signal terminal, a source of the third transistor is electrically connected to a sensing signal terminal, and a drain of the third transistor is electrically connected to the third node.

14. The display panel of claim 13, wherein the first scan signal terminal outputs a first scan signal, the second scan signal terminal outputs a second scan signal, a driving time sequence of the pixel driving circuit comprises a data writing stage and a data clearing stage, and the driving time sequence of the pixel driving circuit comprises a first driving time sequence and a second driving time sequence;

in the data writing stage of the first driving time sequence, the first scan signal is at a high potential, the second scan signal is at a low potential, the data signal is at the high potential, and the driving transistor is in an on-state; in the data clearing stage of the first driving time sequence, the first scan signal is at the low potential, the second scan signal is at the high potential, the data signal is at the low potential, and the driving transistor is in an off-state;

in the data writing stage of the second driving time sequence, the first scan signal is at the low potential, the second scan signal is at the high potential, the data signal is at the high potential, and the driving transistor is in the on-state; in the data clearing stage of the second driving time sequence, the first scan signal is at the high potential, the second scan signal is at the low potential, the data signal is at the low potential, and the driving transistor is in the off-state; and in any one frame period, the pixel driving circuit is driven in one of the first driving time sequence and the second driving time sequence; and in a plurality of frame periods, the pixel driving circuit is alternately driven in the first driving time sequence and the second driving time sequence.

15. The display panel of claim 13, wherein the pixel driving circuit further comprises a storage module, the storage module is electrically connected to the first node, the second node, and the third node, and the storage module is configured to store and maintain a threshold voltage of the driving transistor.

16. The display panel of claim 15, wherein the storage module comprises:

a first storage capacitor, wherein a first electrode of the first storage capacitor is electrically connected to the first node, and a second electrode of the first storage capacitor is electrically connected to the third node; and a second storage capacitor, wherein a first electrode of the second storage capacitor is electrically connected to the second node, and a second electrode of the second storage capacitor is electrically connected to the third node.

* * * * *